(12) United States Patent
Osanai et al.

(10) Patent No.: US 6,237,717 B1
(45) Date of Patent: May 29, 2001

(54) NOISE INSULATING MEMBER HAVING LOW DEGREE OF WATER AND OIL ABSORBENCY

(75) Inventors: Shinsuke Osanai, Komaki; Kiyomi Nishida, Inuyama, both of (JP)

(73) Assignee: Tokai RubberIndustries, Ltd., Komaki (JP)

( * ) Notice: Subject to any disclaimer, the term of this patent is extended or adjusted under 35 U.S.C. 154(b) by 0 days.

(21) Appl. No.: 09/493,706

(22) Filed: Jan. 28, 2000

(30) Foreign Application Priority Data

Jan. 28, 1999 (JP) .................................................. 11-020248

(51) Int. Cl.⁷ ...................................................... E04B 1/84
(52) U.S. Cl. ...................... 181/294; 181/210; 181/211; 181/204; 181/284; 252/62; 428/423.1
(58) Field of Search ..................................... 181/294, 210, 181/211, 198, 204, 205, 284, 296; 106/2; 252/62, 62.3 Q; 428/411.1, 421, 423.1; 264/50, 51, 54, 331.19

(56) References Cited

U.S. PATENT DOCUMENTS

| | | | |
|---|---|---|---|
| 4,048,366 | * 9/1977 | Kingsbury | 428/215 |
| 4,101,704 | * 7/1978 | Hiles | 428/218 |
| 5,208,271 | 5/1993 | Gallagher . | |
| 5,438,107 | * 8/1995 | Doi et al. | 525/456 |
| 5,467,747 | * 11/1995 | Brandt et al. | 123/198 E |
| 5,567,922 | * 10/1996 | Schmuck et al. | 181/284 |
| 5,703,136 | * 12/1997 | Gillis et al. | 521/128 |
| 5,780,521 | * 7/1998 | Shmidt et al. | 521/79 |
| 5,851,458 | * 12/1998 | De Vos et al. | 264/46.5 |

FOREIGN PATENT DOCUMENTS

| | | |
|---|---|---|
| 37 24 680 A1 | 2/1989 | (DE) . |
| 38 24 355 A1 | 1/1990 | (DE) . |
| 197 39 778 A1 | 3/1998 | (DE) . |
| 0 433 878 A2 | 6/1991 | (EP) . |
| 57-22051 | 5/1982 | (JP) . |
| 61-50965 | 11/1986 | (JP) . |
| 8-40154 | 2/1996 | (JP) . |

OTHER PUBLICATIONS

Database WPI Section Ch, Week 199833, Derwent Publications Ltd., London, GB; Class A25, AN 1998–381329, XP002138186 & JP 10–152573 A (Agency of Ind. Sci. & Technology), Jun. 9, 1998 *abstract*.

* cited by examiner

*Primary Examiner*—Jeffrey Donels
*Assistant Examiner*—Edgardo San Martin
(74) *Attorney, Agent, or Firm*—Burr & Brown

(57) ABSTRACT

A noise insulating member having a low degree of water absorbency and a low degree of oil absorbency. The noise insulating member includes a polyurethane foam obtained by reaction of an organic polyisocyanate component and a polyol component in the presence of a fluorine-containing surfactant, and having a cellular network having cells and communication holes which communicate with said cells. The communication holes have respective diameters each of which is not larger than 60 $\mu$m.

15 Claims, 1 Drawing Sheet

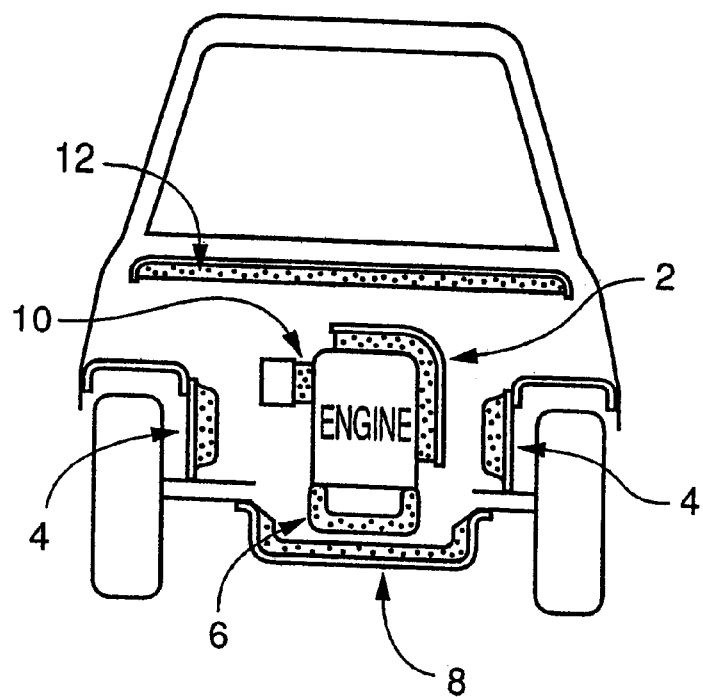
FIG. 1 - Prior Art
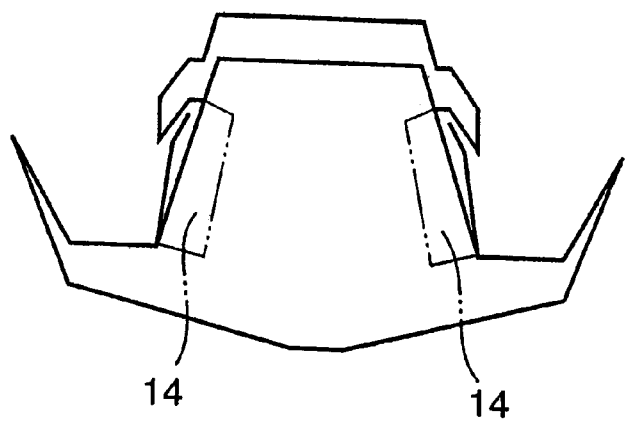
FIG. 2 - Prior Art

NOISE INSULATING MEMBER HAVING LOW DEGREE OF WATER AND OIL ABSORBENCY

BACKGROUND OF THE INVENTION

1. Field of the Invention

The present invention relates in general to a noise insulating member having a low degree of water absorbency and a low degree of oil absorbency. More particularly, the invention is concerned with a noise insulating material which is made of a polyurethane foam having a low degree of water absorbency and a low degree of oil absorbency, so as to be suitable for forming a noise insulating member for use in an automotive vehicle or a hydro-bike.

2. Discussion of the Related Art

There have been conventionally used various types of noise insulating member in an automotive vehicle, for reducing undesirable transmission of noise into the passenger compartment or to the outside of the vehicle. In the engine room of the vehicle, for example, an engine topcover 2, an engine sidecover 4, an oilpan cover 6, an engine undercover 8 and other noise insulating covers are provided around the engine, i.e., a generator of a noise, as shown in FIG. 1, in the interest of reducing radiation of the noise from the engine. Each of these noise insulating covers consists of a metallic plate or other rigid member, and a rubber or urethane foam or other foam body which is fixed to the rigid member. In addition to these noise insulating covers, a spacer 10 formed of a rubber or urethane foam or other foam body is positioned in a space between the engine and accessories such as a fuel injection pump, which are located adjacent to the engine, in the interest of minimizing generation of standing wave in the space. Further, in the engine room of the vehicle, there are provided a hood silencer 12, an intake pipe silencer (not shown), a dashboard silencer (not shown) and other noise insulating covers or members which are formed of respective foam bodies.

The above-described noise insulating members provided in an automotive vehicle are likely to be exposed to water or raindrop, in some cases, for example, where the vehicle runs in a rain, or where the vehicle is washed or cleaned with water in a periodic inspection or on other occasion. In this view, the foam body used to constitute each of these noise insulating members is required to have a high degree of water repellency or a low degree of water absorbency, so that the water or raindrop is not absorbed into the foam body even where the noise insulating member is exposed to the water or raindrop. Further, each of the noise insulating members 2, 4, 6, 8, 10, 12, which are located around the engine, needs to be constituted by the foam body having a high degree of oil repellency or a low degree of oil absorbency as well as a high degree of water repellency or a low degree of water absorbency, since these members 2, 4, 6, 8, 10, 12 are possibly exposed to an engine oil or other lubricant which has leaked from the engine. It is important to note that the noise insulating member may become inflammable if the member contains the oil absorbed therein.

In recent years, there is an increasing number of people who enjoy riding on a water- or hydro-bike as an aquatic sport. For the purpose of reducing radiation of noise from the engine in such a hydro-bike, it has been proposed to attach a suitable noise insulating member to an inside wall of a lateral part of the main body or hull, or to other part of the hull. A reference numeral 14 in FIG. 2 designates such a noise insulating member, by way of example, which is provided for the above purpose. Like the above-described noise insulating members 2, 4, 6, 8, 10, 12 which are employed in a road vehicle, this noise insulating member 14 needs to have not only a high degree of water repellency but also a high degree of oil repellency, because the hydro-bike runs on water, and the noise insulating member 14 is positioned near the engine.

The noise insulating member for use in an automotive vehicle or a hydro-bike is constituted by a rubber foam as the foam body. Where the noise insulating member serves as the above-described spacer 10, the noise insulating member is required to simply reduce a resonance noise, and to have a high degree of heat resistance rather than a high degree of acoustic absorption coefficient. To this end, the spacer 10 is constituted by a rubber foam having a closed-cell network which is made of CR, EPDM or other material, and in which there is a predominance of non-communicating cells. However, the rubber foam made of EPDM suffers from a low degree of oil resistance. In addition, it is difficult to obtain a soft foam body having a density of as small as 0.1 g/cm$^3$ or so, by using a rubber composition, since the rubber foam has a weight larger than the urethane foam or other foam body.

The urethane foam (polyurethane foam) is also used as the foam body for giving the noise insulating member. The urethane foam provides a soft foam body having a density of as small as 0.1 g/cm$^3$ or so. Thus, the urethane foam is advantageously used where the foam body is required to have a light weight. In an attempt to improve waterproof property of the urethane foam, it is proposed to cover the surface of the urethane foam body with a film or other coating, as disclosed in JP-A-08-40154. Further, it is proposed to use a foam body is which is obtained by using as additives a hydrophobic polyol and an asphalt component, as disclosed in JP-B-57-22051 or JP-B-61-50965. However, these disclosed arrangements do not provide a substantial improvement in the water repellency or oil repellency of the foam body, but rather lead to an undesirable increase of the weight of the foam body and also a further complicated operation in the production of the noise insulating member, deteriorating the productivity.

It might be possible to improve the waterproof property of the foam body, by increasing a degree of independency of the cells of each other, or by providing the structure of the foam body with a certain degree of hydrophobicity. The degree of independency of the cells could be increased by reducing the size of each cell, namely, by increasing the density of the foam body, or alternatively by closing the cells from each other. However, these methods cause an increase of the weight of the noise insulating member and also deteriorate the appearance of the foam body due to shrinkage of the material in the forming process.

SUMMARY OF THE INVENTION

It is therefore a first object of the present invention to provide a noise insulating member made of a polyurethane foam and having a sufficiently low degree of water absorbency and a sufficiently low degree of oil absorbency as well as excellent noise insulating properties.

It is a second object of the present invention to provide a noise insulating member which is suitable for use in an automotive vehicle and which is capable of exhibiting a sufficiently high degree of oil repellency and a sufficiently high degree of water repellency.

It is a third object of the present invention to provide a noise insulating member which is suitable for use in a hydro-bike and which is capable of exhibiting a sufficiently high degree of oil repellency and a sufficiently high degree of water repellency.

The above first object may be achieved according to a first aspect of the present invention, which provides a noise insulating member having a low degree of water absorbency and a low degree of oil absorbency. The noise insulating member comprises a polyurethane foam obtained by reaction of an organic polyisocyanate component and a polyol component in the presence of a fluorine-based surfactant or fluorine-containing surfactant, and having a cellular network having cells and communication holes which communicate with the cells and which have respective diameters each of which is not larger than 60 $\mu$m, more preferably not larger than 20 $\mu$m.

The noise insulating member of the present invention is constituted by the polyurethane foam which includes the fluorine-containing surfactant in its resin structure. The fluorine-containing surfactant advantageously provides the polyurethane foam with not only an excellent water repellency but also an excellent oil repellency. Further, the polyurethane foam has the cellular network in which the cells are held in communication with each other through the respective communication holes whose diameters are made small to increase the degree of mutual independency of the cells. This increased mutual independency of the cells contributes to improvements in the noise insulating properties of the polyurethane foam as well as in the water and oil repellency.

According to a first preferred form of the first aspect of the invention, the polyurethane foam has a gas permeability which permits a rate of gas flow therethrough of not higher than 1000 mL/min. It is noted that this rate of gas flow represents an amount per minute of the gas passing through an area of 900 $\pi$ mm$^2$ (e.g. a circular area having a radius of 30 mm) over a distance of 10 mm in the foam body, when the pressure on one of opposite sides of the foam body which is exposed to a reduced pressure is reduced to be lower by 10 mm H$_2$O, than the pressure on the other side which is exposed to the atmospheric pressure.

According to a second preferred form of the first aspect of the invention, the fluorine-containing surfactant is added to the reaction system of the organic polyisocyanate component and the polyol component for forming the polyurethane foam, preferably, such that the amount of the fluorine-containing surfactant is 0.1–5.0 parts by weight per 100 parts by weight of a polyurethane resin which is produced as a result of the reaction of the organic polyisocyanate component and the polyol component.

According to a third preferred form of the first aspect of the invention, the fluorine-containing surfactant added to the reaction system includes a fluoro-aliphatic group having 3–20 carbon atoms, more preferably a fluoro-aliphatic group having 6–12 carbon atoms, thereby further improving the water and oil repellency of the noise insulating member.

According to a fourth preferred form of the first aspect of the invention, the fluorine-containing surfactant includes an organic group having a high degree of affinity with respect to a polyurethane resin which is produced as a result of the reaction of the organic polyisocyanate component and the polyol component, so that the fluorine-containing surfactant has an increased compatibilty with the polyurethane resin. The increased compatibility of the fluorine-containing surfactant with the polyurethane resin effectively enables the fluorine-containing surfactant to provide the above-described advantages.

According to a fifth preferred form of the first aspect of the invention, the fluorine-containing surfactant has an average molecular weight of 500–1,000,000.

The above second object may be achieved according to a second aspect of the present invention, which provides a noise insulating member for use in an automotive vehicle, comprising a polyurethane foam obtained by reaction of an organic polyisocyanate component and a polyol component in the presence of a fluorine-containing surfactant, and having a cellular network having cells and communication holes which communicate with the cells, wherein each of the communication holes has a diameter not larger than 60 $\mu$m, and gas permeability which permits a rate of gas flow therethrough of not higher than 1000 mL/min.

The above-described noise insulating member may be advantageously used as a noise insulating cover provided in an engine room of an automotive vehicle so as to be positioned adjacent to or around an engine of the automotive vehicle, for reducing radiation of noise from the engine, or may be advantageously used as a spacer provided in an engine room of an automotive vehicle so as to be positioned in a space between an engine of the automotive vehicle and accessories which are located adjacent to the engine, for minimizing generation of standing wave in the space.

The above third object may be achieved according to a third aspect of the present invention, which provides a noise insulating member provided in a hull of a hydro-bike, for reducing radiation of noise from an engine of the hydro-bike, the noise insulating member comprising a polyurethane foam obtained by reaction of an organic polyisocyanate component and a polyol component in the presence of a fluorine-containing surfactant, and having a cellular network having cells and communication holes which communicate with the cells, wherein each of the communication holes has a diameter not larger than 60 $\mu$m, and gas permeability which permits a rate of gas flow therethrough of not higher than 1000 mL/min.

BRIEF DESCRIPTION OF THE DRAWINGS

The above and optional object, features, advantages and technical significance of the present invention will be better understood by reading the following detailed description of presently preferred embodiments of the invention, when considered in conjunction of the accompanying drawings, in which:

FIG. 1 is a view schematically showing various noise insulating covers or members arranged around the engine in the engine room of an automotive vehicle; and FIG. 2 is a view schematically showing noise insulating members provided in the hull of a hydro-bike.

DETAILED DESCRIPTION OF THE PREFERRED EMBODIMENTS

The noise insulating member of the present invention is constituted by a polyurethane foam which is obtained by reaction of an organic polyisocyanate component and a polyol component. Either of the organic polyisocyanate component and the polyol component may be selected from any conventionally known materials. The organic polyisocyanate component may be selected from among tolylene diisocyanate, phenylene diisocyanate, xylylene diisocyanate, diphenylmethane diisocyanate, triphenylmethane triisocyanate, polymethylene polyphenyl isocyanate and naphthalene diisocyanate, or their derivatives, such as prepolymer which is obtained by reaction of polyisocyanate with polyol or the like, and modified polyisocyanate or the like.

On the other hand, the polyol component, which reacts with the organic polyisocyanate component so as to form the polyurethane, may be selected from among various known kinds of polyols such as polyhydric hydroxy compound, polyetherpolyols, polyesterpolyols, polymerpolyols, polyetherpolyamines, polyesterpolyamines, alkylenepolyols, urea-dispersed polyols, melamine-modified polyols, polycarbonatepolyols, acrylpolyols, olybutadienepolyols, phenol-modified polyols. The polyol component may be a combination of these various kinds of polyols.

The essence of the present invention is that the desired noise insulating member is constituted by the polyurethane foam which is obtained as a result of a reacting/foaming (foaming/curing) operation in which the above-described organic polyisocyanate component and the above-described polyol component react with each other in the presence of a fluorine-based or fluorine-containing surfactant. Thus, the fluorine-containing surfactant is introduced into the formed polyurethane resin (polyurethane foam) by the reacting/foaming operation in the presence of the fluorine-containing surfactant. In addition, the polyurethane resin is given a foam structure in which the cells communicate with each other through the communication holes each having the diameter not larger than 60 $\mu$m. The foam structure has gas permeability permitting a rate of gas flow therethrough of not higher than 1000 mL/min. This arrangement advantageously provides the noise insulating member with a sufficiently high degree of water repellency and a sufficiently high degree of oil repellency as well as excellent noise insulating properties.

The fluorine-containing surfactant, providing the advantages as described above, includes a fluoro-aliphatic group in which hydrogen atoms of hydrophobic group of hydrocarbon-containing surfactant are entirely or partially substituted by fluorine atoms and which has preferably 3–20 carbon atoms, more preferably 6–12 carbon atoms. Particularly, the fluorine-containing surfactant having a perfluoroalkyl group is advantageously used.

It is preferable that the fluorine-containing surfactant has a high degree of affinity with respect to the polyurethane resin. To this end, the fluorine-containing surfactant includes an organic group having a high degree of affinity with respect to the polyurethane resin. Such an organic group may be selected from among a lower or higher alkyl group, an alkylidene group, an aryl group, an acyl group, a vinyl group, a vinylidene group, an ethylenic double bond, a hydroxy group, a carboxyl group, an amino group, an epoxy group, a halogen, a polydimethylsiloxane group, a mercapto group, a polyoxyalkylene group and other group. Of these groups, the polyoxyalkylene group is the most preferable since it is advantageous that the organic group has a high degree of compatibility with the polyol component in the production of the polyurethane foam.

In the present invention, the fluorine-containing surfactant having the fluoro-aliphatic group and also the organic group having a high degree of affinity with respect to the polyurethane resin is advantageously used, as described above. Examples of such a fluorine-containing surfactant include a compound having, in each molecule thereof, the fluoro-aliphatic group and the organic group having a high degree of affinity with respect to the polyurethane resin, and a random, block or graft copolymer of unsaturated monomer including the fluoro-aliphatic group and an unsaturated monomer including the organic group having a high degree of affinity with respect to the polyurethane resin.

The fluorine-containing surfactant has an average molecular weight of 500–1,000,000, preferably 900–500,000. If the average molecular weight were smaller than 500, it would be difficult for the fluorine-containing surfactant to exhibit a sufficiently high modifying effect. If the average molecular weight were larger than 1,000,000, the compatibility of the fluorine-containing surfactant with respect to the polyurethane resin would be undesirably reduced.

The fluorine-containing surfactant is included in or added to the reaction system of the organic polyisocyanate component and the polyol component, for forming the polyurethane foam such that the amount of the fluorine-containing surfactant is 0.1–5.0 parts by weight per 100 parts by weight of polyurethane resin which is produced as a result of the reaction of the organic polyisocyanate component and the polyol component. If the added amount of the fluorine-containing surfactant were smaller than 0.1 part by weight, the polyurethane resin (foam) would not likely to be satisfactorily modified. If the added amount of the fluorine-containing surfactant were larger than 5.0 parts by weight, the polyurethane foam would not likely to be satisfactorily obtained due to possible destruction of the cells or other problems.

In the present invention, a suitable amount of water is used as a foaming agent for foaming the polyurethane (resin) which is formed by the reaction of the organic polyisocyanate component and the polyol component in the presence of the fluorine-containing surfactant. The water reactions with the organic polyisocyanate component to form a carbonic acid gas, for thereby exhibiting a foaming effect. The water is used in an amount of 1.0–6.0 parts by weight, preferably 2.0–5.0 parts by weight, per 100 parts by weight of the polyol component. If the amount of water to be used were smaller than 1.0 parts by weight, the obtained polyurethane foam would not be foamed to a satisfactory extent, and accordingly tends to increase its density. If the amount of water to be used were larger than 6.0 parts by weight, the foaming or expansion ratio would not be increased with an increase of the amount of water. In this case, the obtained foam body suffers from a lowered quality such as irregularity of voids or cells.

In the production of the polyurethane foam (foam body), which constitutes the desired noise insulating member, by reaction and foaming of the organic polyisocyanate component and the polyol component in the presence of the suitable fluorine-containing surfactant, according to the present invention, suitable additives known in the art such as a catalyst, a cross-linking agent, a foaming agent, a foam stabilizer, a flame retardant, a viscosity-reducing agent, a stabilizer, a filler and a coloring agent may be added to the respective reaction mixtures. As the catalyst, amine urethane catalysts such as triethylene diamine and dimethylethanolamine or organometallic urethane catalysts such as tin laurate and tin octanoate are used. In the present invention, wherein the water is generally used as the foaming agent, flon, methylene chloride and $CO_2$ gas may be used as the foaming agent in addition to, or in place of the water, for instance. Examples of the foam stabilizer include "SRX-274C" available from TORAY DOW CORNING CORPORATION, Japan "L-5390" available from NIPPON UNICAR COMPANY LIMITED, Japan, and "B-4113" available from GOLDSCHMIDT, Germany. As the cross-linking agent, triethanolamine or diethanolamine is generally used.

In the production of the desired polyurethane foam, the suitable amount of the fluorine-containing surfactant is first added to the polyol component, and the respective suitable amounts of the water as the foaming agent, the catalyst, the cross-linking agent, the foam stabilizer and other processing aid are then mixed with the suitable amount of the polyol component so as to provide a resin premixture (premixture polyol). To the thus prepared resin premixture, the suitable organic polyisocyanate is added for reaction, to thereby provide the desired polyurethane foam. Described more specifically, the resin premixture and the organic polyisocyanate component are mixed together by using a known urethane foaming device such that the mixture has an isocyanate index in the range of 60–110, preferably in the range of 70–100. The mixture is poured into a suitable mold, for reaction and foaming, whereby the polyurethane foam having a desired shape is obtained.

In the thus obtained polyurethane foam, the communication holes for communication of the cells with each other, have respective diameters each of which is not larger than 60 $\mu$m, preferably not larger than 20 $\mu$m, and the polyurethane foam has a gas permeability which permits a rate of gas flow therethrough of not higher than 1000 mL/min, preferably not higher than 500 mL/min, so that the polyurethane foam is provided with a sufficiently high degree of water repellency and a sufficiently high degree of oil repellency as well as excellent noise insulating properties. Thus, the polyurethane foam satisfactorily serves as a noise insulating member.

In other words, the presence of the suitable fluorine-containing surfactant in the reaction system of the organic polyisocyanate component and the polyol component for forming the desired polyurethane foam is effective to obtain the foam structure in which the communication holes communicating with the cells have remarkably reduced diameters, without considerably increasing or reducing the foaming or expansion ratio. The communication holes having the reduced diameters permit the air and the gas generated in the foaming process to pass therethrough, but do not permit a droplet of water or oil to pass therethrough due to its surface tension, thereby contributing to the reduction of the oil absorbency and the water absorbency. Further, the reduction of the diameters of the communication holes increases reflections of incident or incoming acoustic wave in each cell, whereby the noise is more effectively damped, resulting in a remarkable improvement in the noise insulating properties of the noise insulating member.

The term "gas permeability" is interpreted to mean an amount of gas or air flow within a specimen (polyurethane foam) which is measured under a predetermined condition. The measurement of the gas permeability is achieved by using a jig in the form of a plate having a cylindrical through-hole of a 60 mm diameter formed in its central portion. First, the polyurethane foam as the specimen having a plate shape of 75 mm×75 mm×10 mm$^t$ is brought at one of its opposite surfaces in contact with the jig so that a portion of that surface is exposed to the atmosphere through the through-hole, while the other surface of the polyurethane foam is exposed to a reduced pressure generated by a vacuum pump. Then, the gas permeability is obtained by measuring the amount of air introduced into the vacuum pump, i.e., the amount of air passed through the polyurethane foam, by a suitable flow meter, when the pressure at the above-indicated other surface is reduced to be lower by 10 mm $H_2O$ than the pressure at the above-described one surface.

The polyurethane foam obtained as described above is advantageously used as the noise insulating member of the present invention, which is characterized by its low degree of water absorbency and its low degree of oil absorbency. The thus characterized noise insulating member is advantageously used in an automotive vehicle for serving as a noise insulating cover, such as an engine topcover 2, an engine sidecover 4, an oilpan cover 6, an engine undercover 8, a hood silencer 12 and a dashboard silencer (not shown), which are provided in an engine room of the vehicle, so as to be positioned around an engine of the vehicle, as shown in FIG. 1, for the purpose of reducing the noise which radiates from the engine, or for serving as a spacer 10 which is positioned in a space between the engine and accessories that are located adjacent to or around the engine, so as to minimize a standing wave generated in the space. The noise insulating member is advantageously used also in a hydro-bike, serving as a noise insulating member 14 which is provided in a hull of the hydro-bike, as shown in FIG. 2, for reducing radiation of a noise from the engine.

EXAMPLES

To further clarify the principle of the present invention, there will be described some examples of the noise insulating member constructed according to the present invention. However, it is to be understood that the invention is by no means limited to the details of these examples, but may be embodied with various changes, modifications and improvements which may occur to those skilled in the art, without departing from the scope of the invention.

As the examples, various types of polyurethane foam bodies were prepared in the following procedure. That is, for preparing the polyurethane foam bodies, respective compounding agents A–D were first added to the polyol component in the form of "SUMIPHEN3063" (polyetherpolyol available from SUMITOMO BAYER URETHANE KABUSHIKI KAISHA, Japan, and having an OH value of 28 and a functionality of 3), in predetermined respective parts by weight per 100 parts by weight of the polyetherpolyol, as indicated in Tables 1 and 2. Then, 2.5 parts by weight of water as a foaming agent; 0.5 parts by weight of "KAOLIZER No. 31" as a catalyst (tertiary amine catalyst available from KAO CORPORATION, Japan); 0.2 parts by weight of "TOYOCAT-ET" as a catalyst (tertiary amine catalyst available from TOSOH CORPORATION, Japan); and 0.5 parts by weight of "L-3601" as a foam stabilizer (available from available from NIPPON UNICAR COMPANY LIMITED, Japan) were mixed with the polyol component so as to provide a premixture polyol.

To the thus prepared premixture polyol, the organic polyisocyanate component in the form of isocyanate-modified MDI (NCO=30–31%) was added such that the mixture had an isocyanate index of 95. The mixture was then poured into a suitable mold by using a low- or high-pressure casting device, and was foamed and cured at a temperature of 40–70° C. for 10–30 minutes, to thereby provide each of the polyurethane foam bodies having respective characteristics as indicated in Tables 1 and 2.

The compounding agent A was "FX-3" which was a fluorine-containing surfactant available from DAINIPPON INK AND CHEMICALS, INCORPORATED, Japan, and formed of a fluorine-containing urethane oligomer. The "FX-3" was a methylethylketone solution having a solid content of 60%, which includes a perfluoroalkyl group bond at each of opposite ends thereof. The compounding agent B was "MCF-310" which was a fluorine-containing surfactant available from DAINIPPON INK AND CHEMICALS, INCORPORATED and formed of a fluorine acryl oligomer. The "MCF-310" was a methylethylketone/ methylisobutylketone solution having a solid content of 30%, which includes a hydroxyl group. The compounding agent C was "SERESTARL20R" which was a petroleum wax available from IPPOSHA YOSHI KABUSHIKI KAISHA, Japan. The "SERESTARL20R" was a milky-white emulsion having a solid content of 40%. The compounding agent D was "ELESTAN540" which was a fatty-acid-ester/silicon compound having a light yellow color. For obtaining each of the polyurethane foam bodies, the corresponding one of these compounding agents A, B, C and D was added to the reaction system for forming the desired polyurethane foam, with a predetermined value (phr) of parts by weight per 100 parts by weight of the polyurethane resin, as indicated in Tables 1 and 2.

Tables 1 and 2 further indicate a gas permeability in each urethane foam body which represents a rate of gas flow through the foam body and which was measured as described above, and a contact angle of each urethane foam body. For measuring the contact angle, the polyurethane foam body is formed in a molding method in which a PP (polypropylene) plate is disposed on a cavity surface of a lower mold, so that the formed polyurethane foam body is provided with a skin layer which is not influenced by a mold releasing agent applied to the cavity surface. In the measurement of the contact angle, the polyurethane foam body is partially submerged in water, and the angle between the surface of the water and the surface of the skin layer is measured as the contact angle.

TABLE 1

| | | EXAMPLES OF PRESENT INVENTION | | | | |
|---|---|---|---|---|---|---|
| | | 1 | 2 | 3 | 4 | 5 |
| FOAM DENSITY (g/cm$^3$) | | 0.1 | 0.1 | 0.18 | 0.1 | 0.1 |
| COMPOUNDING AGENT A (phr) | | 0.5 | 1.5 | 1.5 | 3 | — |
| COMPOUNDING AGENT B (phr) | | — | — | — | — | 3 |
| CELL STRUCTURE | OPEN-CELL RATIO (%) | 85 | 70 | 50 | 65 | 70 |
| | CELL DIA. ($\mu$m) | 150–400 | 120–300 | 100–200 | 100–240 | 100–200 |
| | COMMUNICATION HOLE DIA. ($\mu$m) | 20–60 | 20–60 | ≦15 | ≦10 | ≦15 |
| GAS PERMEABILITY (cc/min) | | 800 | 160 | 45 | 100 | 150 |
| CONTACT ANGLE (degree) | | 101 | 105 | 107 | 110 | 107 |

TABLE 2

| | | COMPARATIVE EXAMPLES | | | |
|---|---|---|---|---|---|
| | | 1 | 2 | 3 | 4 |
| FOAM DENSITY (g/cm$^3$) | | 0.1 | 0.18 | 0.1 | 0.1 |
| COMPOUNDING AGENT C (phr) | | — | — | 5 | — |
| COMPOUNDING AGENT D (phr) | | — | — | — | 3 |
| CELL STRUCTURE | OPEN-CELL RATIO (%) | 95 | 75 | 90 | 90 |
| | CELL DIA. ($\mu$m) | 200–500 | 200–300 | 200–500 | 200–500 |
| | COMMUNICATION HOLE DIA. ($\mu$m) | 60–100 | 60–80 | 60–100 | 60–100 |
| GAS PERMEABILITY (cc/min) | | 6000 | 1500 | 5000 | 7000 |
| CONTACT ANGLE (degree) | | 95 | 95 | 102 | 100 |

Tables 1 and 2 indicate an open-cell ratio in each of the various types of polyurethane foam bodies (Examples of the present invention Nos. 1–5 and Comparative Examples Nos. 1–4), which ratio represents characteristics of the structure of the foam body, and a communicating hole diameter which is the diameter of each of the communication holes for mutual communication of the cells in each foam body. The open-cell ratio was measured by using an air-comparative hydrometer "Type-1000" available from TOKYO SCIENCE INCORPORATED, Japan.

Further, for each polyurethane foam body, its coefficient of water absorption, oil absorbency and noise transmission loss which are indicative of required basic characteristics of the noise insulating member were measured or evaluated. Tables 3 and 4 indicate the result of the measurements and evaluations.

The coefficient of water absorbency represents a change rate of weight of each polyurethane foam body having a rectangular shape with dimensions of 100 mm×100 mm×50 mm$^t$, where the polyurethane foam body was immersed in water at a room temperature for 24 hours. The change rate was obtained on the basis of the weight before the immersion and the weight after the immersion. The water absorbency was evaluated in accordance with two methods A and B. In the evaluation method A, 3 mL of an engine oil was first dropped onto the surface of the skin layer of each polyurethane foam body, and it was then checked as to whether the dropped oil remained on the surface or permeated into the skin layer at the times when one, two, three and four hours passed since the oil was dropped onto the surface. In Tables 3 and 4, "○" indicates that the oil remained on the surface, maintaining its spherical droplet shape even at the time four hours after the dropping of the oil onto the surface; "Δ" indicates that the oil did not maintain the spherical shape but remained on the surface with a semi-spherical shape thereof at the time when one hour passed; and "X" indicates that the oil had permeated into the skin layer at the time when one hour passed. In the evaluation method B, the water absorbency was measured as a change rate of weight of each polyurethane foam body having the rectangular shape with dimensions of 100 mm×100 mm×50 mm', where the polyurethane foam body was immersed in an engine oil at a room temperature for 24 hours.

The noise transmission loss was measured in accordance with JIS-A-1461, with respect to a noise having a frequency of 1000 Hz and a noise having a frequency of 2000Hz.

TABLE 3

| | | EXAMPLES OF PRESENT INVENTION | | | | |
|---|---|---|---|---|---|---|
| | | 1 | 2 | 3 | 4 | 5 |
| COEFFICIENT OF WATER ABSORPTION (%) | | +52.8 | +25.3 | +6.8 | +19.2 | +33.4 |
| OIL ABSORBENCY | EVALUATION METHOD A | Δ | ○ | ○ | ○ | ○ |
| | EVALUATION METHOD B (%) | +400.0 | +14.0 | +8.2 | +7.8 | +20.0 |
| TRANSMISSION LOSS (dB) | 1000 Hz | 20.0 | 21.5 | 25.5 | 21.0 | 20.5 |
| | 2000 Hz | 24.0 | 25.5 | 31.5 | 25.0 | 24.5 |

TABLE 4

| | | COMPARATIVE EXAMPLES | | | |
|---|---|---|---|---|---|
| | | 1 | 2 | 3 | 4 |
| COEFFICIENT OF WATER ABSORPTION (%) | | +382.6 | +60.0 | +100.2 | +321.4 |
| OIL ABSORBENCY | EVALUATION METHOD A | × | × | × | × |
| | EVALUATION METHOD B (%) | +700.0 | +500.0 | +750.0 | +650.0 |
| TRANSMISSION LOSS (dB) | 1000 Hz | 19.5 | 24.0 | — | — |
| | 2000 Hz | 23.5 | 29.0 | — | — |

As is apparent from the results indicated in Tables 1–4, in the polyurethane foam obtained in the presence of the fluorine-contained surfactant which is added to the reaction system of the organic polyisocyanate component and the polyol component, the communication holes communicating with the cells have respective diameters each of which is not larger than 60 μm, and the gas permeability through the polyurethane foam is held not higher than 1000 mL/min. Further, the fluorine-containing surfactant included in the resin structure of the polyurethane foam is effective to reduce both of the coefficient of water absorption and the oil absorbency thereby remarkably improving the water and oil repellency of the foam body, and also to increase the noise transmission loss thereby assuring the excellent noise insulating properties of the foam body.

As is clear from the above description, the noise insulating member constructed according to the present invention has excellent water and oil repellency as well as excellent noise insulating properties. The noise insulating member of the invention is advantageously used in an automotive vehicle, particularly, in the engine room of the vehicle, for reducing undesirable transmission of noise into the passenger compartment or to the outside of the vehicle. The noise insulating member is also advantageously used in a hydrobike.

What is claimed is:

1. A noise insulating member having a low degree of water absorbency and a low degree of oil absorbency, said noise insulating member comprising:
   a polyurethane foam obtained by reaction of an organic polyisocyanate component and a polyol component in the presence of a fluorine-containing surfactant, and having a cellular network having cells and communication holes which communicate with said cells and which have respective diameters each of which is not larger than 60 μm.

2. A noise insulating member according to claim 1, wherein said each of the diameters of said communication holes is not larger than 20 μm.

3. A noise insulating member according to claim 1, wherein said polyurethane foam has a gas permeability which permits a rate of gas flow therethrough of not higher than 1000 mL/min.

4. A noise insulating member according to claim 1, wherein said fluorine-containing surfactant is added to a reaction system of said organic polyisocyanate component and said polyol component, for forming said polyurethane foam, such that an amount of said fluorine-containing surfactant is 0.1–5.0 parts by weight per 100 parts by weight of a polyurethane resin which is produced as a result of the reaction of said organic polyisocyanate component and said polyol component.

5. A noise insulating member according to claim 1, wherein said fluorine-containing surfactant includes a fluoro-aliphatic group having 3–20 carbon atoms.

6. A noise insulating member according to claim 1, wherein said fluorine-containing surfactant includes a fluoro-aliphatic group having 6–12 carbon atoms.

7. A noise insulating member according to claim 1, wherein said fluorine-containing surfactant includes a perfluoroalkyl group.

8. A noise insulating member according to claim 1, wherein said fluorine-containing surfactant includes an organic group having a high degree of affinity with respect to a polyurethane resin which is produced as a result of the reaction of said organic polyisocyanate component and said polyol component.

9. A noise insulating member according to claim 1, wherein said fluorine-containing surfactant further includes a polyoxyalkylene group.

10. A noise insulating member according to claim 1, wherein said fluorine-containing surfactant includes a fluoro-aliphatic group having 3–20 carbon atoms, and an organic group having a high degree of affinity with respect to a polyurethane resin which is produced as a result of the reaction of said organic polyisocyanate component and said polyol component.

11. A noise insulating member according to claim 1, wherein said fluorine-containing surfactant has an average molecular weight of 500–1,000,000.

12. A noise insulating member for use in an automotive vehicle, comprising:

the polyurethane foam defined in claim 1, wherein said polyurethane foam has a gas permeability which permits a rate of gas flow therethrough of not higher than 1000 mL/min.

13. A noise insulating cover provided in an engine room of an automotive vehicle so as to be positioned adjacent to an engine of the automotive vehicle, for reducing radiation of noise from the engine, said noise insulating cover comprising:

the polyurethane foam defined in claim 1, wherein said polyurethane foam has a gas permeability which permits a rate of gas flow therethrough of not higher than 1000 mL/min.

14. A spacer provided in an engine room of an automotive vehicle so as to be positioned in a space between an engine of the automotive vehicle and accessories which are located adjacent to the engine, for minimizing generation of standing wave in the space, said spacer comprising:

the polyurethane foam defined in claim 1, wherein said polyurethane foam has a gas permeability which permits a rate of gas flow therethrough of not higher than 1000 mL/min.

15. A noise insulating member provided in a hull of a hydro-bike, for reducing radiation of noise from an engine of the hydro-bike, said noise insulating member comprising:

the polyurethane foam defined in claim 1, wherein said polyurethane foam has a gas permeability which permits a rate of gas flow therethrough of not higher than 1000 mL/min.

* * * * *